United States Patent
Ma et al.

(10) Patent No.: US 11,210,022 B2
(45) Date of Patent: Dec. 28, 2021

(54) METHOD, ELECTRONIC DEVICE AND COMPUTER READABLE STORAGE MEDIUM OF STORAGE MANAGEMENT

(71) Applicant: EMC IP Holding Company LLC, Hopkinton, MA (US)

(72) Inventors: Chun Ma, Beijing (CN); Shaoqin Gong, Beijing (CN); Geng Han, Beijing (CN); Jian Gao, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 68 days.

(21) Appl. No.: 16/582,630

(22) Filed: Sep. 25, 2019

(65) Prior Publication Data
US 2020/0133577 A1    Apr. 30, 2020

(30) Foreign Application Priority Data
Oct. 31, 2018   (CN) .......................... 201811291175.7

(51) Int. Cl.
    *G06F 3/06*    (2006.01)
(52) U.S. Cl.
    CPC .......... *G06F 3/0659* (2013.01); *G06F 3/0613* (2013.01); *G06F 3/0673* (2013.01)
(58) Field of Classification Search
    CPC ...... G06F 3/061; G06F 3/0659; G06F 3/0644; G06F 3/0647; G06F 3/0689; G06F 3/0613; G06F 3/0673; G06F 3/0634

USPC ........................................................ 711/154
See application file for complete search history.

(56) References Cited

U.S. PATENT DOCUMENTS

| | | | |
|---|---|---|---|
| 5,960,169 A | 9/1999 | Styczinski | |
| 9,389,975 B2 | 7/2016 | Arakawa et al. | |
| 9,841,908 B1 | 12/2017 | Zhao et al. | |
| 10,140,041 B1 | 11/2018 | Dong et al. | |
| 10,146,640 B2 | 12/2018 | Dudgeon et al. | |
| 10,203,880 B1 | 2/2019 | Armangau et al. | |
| 10,229,022 B1 | 3/2019 | Gao et al. | |
| 10,282,260 B2 | 5/2019 | Lee et al. | |
| 10,339,005 B2 | 7/2019 | McGlaughlin et al. | |
| 10,481,802 B1 | 11/2019 | Gao et al. | |
| 10,599,357 B2 | 3/2020 | Gao et al. | |
| 2013/0047028 A1 | 2/2013 | Daikokuya et al. | |
| 2013/0173955 A1 | 7/2013 | Hallak et al. | |
| 2015/0317556 A1* | 11/2015 | Huang .................... | H04L 67/34 706/23 |

(Continued)

*Primary Examiner* — Hashem Farrokh
(74) *Attorney, Agent, or Firm* — BainwoodHuang (57) ABSTRACT

Techniques involve: determining processing power of a plurality of storage devices in a plurality of storage pools, the storage devices in each of the storage pools having a same device type; dividing the plurality of storage devices into a plurality of sets based on the processing power, a difference in the processing power between the storage devices in each of the sets being below a predetermined threshold; and redistributing, among the plurality of sets, data stored in the plurality of storage devices based on workloads of the storage devices in the sets. Accordingly, load balancing of storage devices in the plurality of storage pools can be implemented, response speed of the storage system can be enhanced and storage resources in the plurality of storage pools can be exploited more sufficiently.

22 Claims, 8 Drawing Sheets

(56) References Cited

U.S. PATENT DOCUMENTS

| | | | |
|---|---|---|---|
| 2015/0347047 A1* | 12/2015 | Masputra | G06F 3/0649 |
| | | | 711/114 |
| 2017/0153845 A1* | 6/2017 | Oe | G06F 3/0611 |
| 2018/0018225 A1* | 1/2018 | Ober | G06F 11/1076 |
| 2019/0050353 A1* | 2/2019 | Xu | G06F 3/061 |
| 2019/0129614 A1* | 5/2019 | Dalmatov | G06F 3/0619 |

* cited by examiner

METHOD, ELECTRONIC DEVICE AND COMPUTER READABLE STORAGE MEDIUM OF STORAGE MANAGEMENT

CROSS-REFERENCE TO RELATED APPLICATION

This application claims priority to Chinese Patent Application No. CN201811291175.7, on file at the China National Intellectual Property Administration (CNIPA), having a filing date of Oct. 31, 2018, and having "METHOD, ELECTRONIC DEVICE AND COMPUTER READABLE STORAGE MEDIUM OF STORAGE MANAGEMENT" as a title, the contents and teachings of which are herein incorporated by reference in their entirety.

FIELD

Embodiments of the present disclosure generally relate to the field of computers, and more specifically, to a method, electronic device and computer readable storage medium of storage management.

BACKGROUND

It is known that a redundant array of independent disks (RAID) can combine a plurality of storage devices into a disk array. By providing redundant storage devices, the RAID-based storage system can make the reliability of the entire disk array well above a single storage device.

In order to satisfy users' requirements for data reliability and response time of a storage system, a mapped redundant array of independent disks (mapped RAID) has already been developed. In the mapped RAID, disk is a logical concept and can include a plurality of extents. A plurality of extents included in one logical disk can be distributed over various physical storage devices (also known as storage devices below) in a storage pool. Traditionally, since it is required that all extents of the mapped RAID should be distributed over storage devices of the same device type, storage devices of different device types are distributed into various storage pools to facilitate the use of the mapped RAID as the storage devices diversify. However, the extents of each mapped RAID are distributed in one storage pool alone and cannot span a plurality of storage pools. Therefore, better utilization of storage resources in the plurality of storage pools has become a hot issue.

SUMMARY

In accordance with embodiments of the present disclosure, there is provided an improved solution of storage management.

In accordance with a first aspect of the embodiments of the present disclosure, there is provided a method of storage management. The method includes: determining processing power of a plurality of storage devices in a plurality of storage pools, the storage devices in each of the storage pools having a same device type; dividing the plurality of storage devices into a plurality of sets based on the processing power, a difference in the processing power between the storage devices in each of the sets being below a predetermined threshold; and redistributing, among the plurality of sets, data stored in the plurality of storage devices based on workloads of the storage devices in the sets.

In accordance with a second aspect of the embodiments of the present disclosure, there is provided an electronic device. The device includes: at least one processor; a memory coupled to the at least one processor and having instructions stored thereon, the instructions, when executed by the at least one processor, causing the device to perform acts including: determining processing power of a plurality of storage devices in a plurality of storage pools, the storage devices in each of the storage pools having a same device type; dividing the plurality of storage devices into a plurality of sets based on the processing power, a difference in the processing power between the storage devices in each of the sets being below a predetermined threshold; and redistributing, among the plurality of sets, data stored in the plurality of storage devices based on workloads of the storage devices in the sets.

In accordance with a second aspect of the embodiments of the present disclosure, there is provided a computer-readable storage medium. The computer-readable storage medium has computer-readable program instructions stored thereon which, when executed by a processing unit, cause the processing unit to perform the method according to the first aspect of the embodiments of the present disclosure.

BRIEF DESCRIPTION OF THE DRAWINGS

Through the following detailed description with reference to the accompanying drawings, features, advantages and other aspects of respective implementations of the present disclosure will become more apparent. Several implementations of the present disclosure are illustrated herein by way of example. In the drawings.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will be described in more details with reference to the drawings. Although the drawings illustrate preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

In the context of the embodiments of the present disclosure, a storage system can be a storage system based on a RAID. The RAID-based storage system can combine a plurality of storage devices into a disk array. The provision of redundant storage devices can make the reliability of the entire disk array well above a single storage device. The RAID can provide various advantages superior to the single storage device, e.g., enhancing data integration and fault tolerance and increasing throughput or capacity etc. There are multiple standards for the RAID, such as RAID-1, RAID-2, RAID-3, RAID-4, RAID-5, RAID-6, RAID-10, RAID-50 and the like. Those skilled in the art, for example, can refer to https://en.wikipedia.org/wiki/Standard_RAID_levels and https://en.wikipedia.org/wiki/Nested_RAID_levels for more details regarding RAID levels.

Figure 1A:
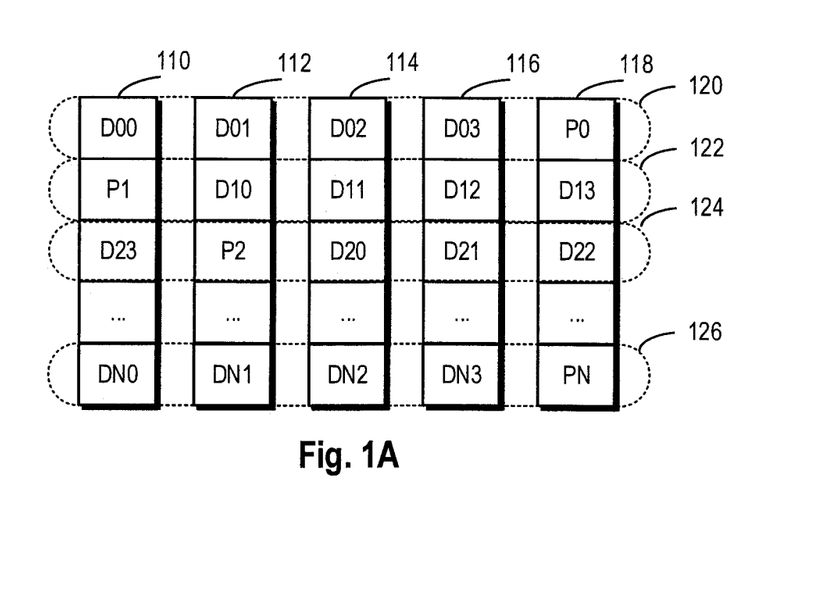
FIGS. 1A and 1B separately illustrate schematic diagrams of a storage system where embodiments of the present disclosure can be implemented.

FIG. 1A schematically illustrates a schematic diagram of a storage system where embodiments of the present disclosure can be implemented. In the storage system illustrated by FIG. 1A, working principles of the RAID are explained by taking RAID-5 (4D+1P, where 4D indicates that the storage system includes four storage devices for data storage while 1P represents that the storage system includes one storage device for storing P parity) array consisting of five independent storage devices (110, 112, 114, 116 and 118). It should be noted that although FIG. 1A schematically illustrates five storage devices, more or fewer storage devices also can be included according to the RAID levels in other implementations. Despite that FIG. 1A illustrates stripes 120, 122, 124 . . . 126, the RAID system also can include different number of stripes in other examples.

Stripes span a plurality of physical storage devices (e.g., the stripe 120 across the storage devices 110, 112, 114, 116 and 118) in the RAID. The stripe can be simply considered as a storage area meeting a given address range in the plurality of storage devices. Data stored in the stripe 120 includes a plurality of parts: data block D00 stored on a storage device 110, data block D01 stored on a storage device 112, data block D02 stored on a storage device 114, data block D03 stored on a storage device 116, and a data block P0 stored on a storage device 118. In this example, the data blocks D00, D01, D02 and D03 are stored data while data block P0 is P parity for the stored data.

The approach for storing data in other stripes 122 and 124 is also similar to stripe 120 and the difference therebetween lies in that the parity related to other data blocks can be stored on a storage device distinct from the storage device 118. In this way, when one of the plurality of storage devices 110, 112, 114, 116 and 118 fails, data in the fault device can be recovered from other normal storage devices.

Figure 1B:
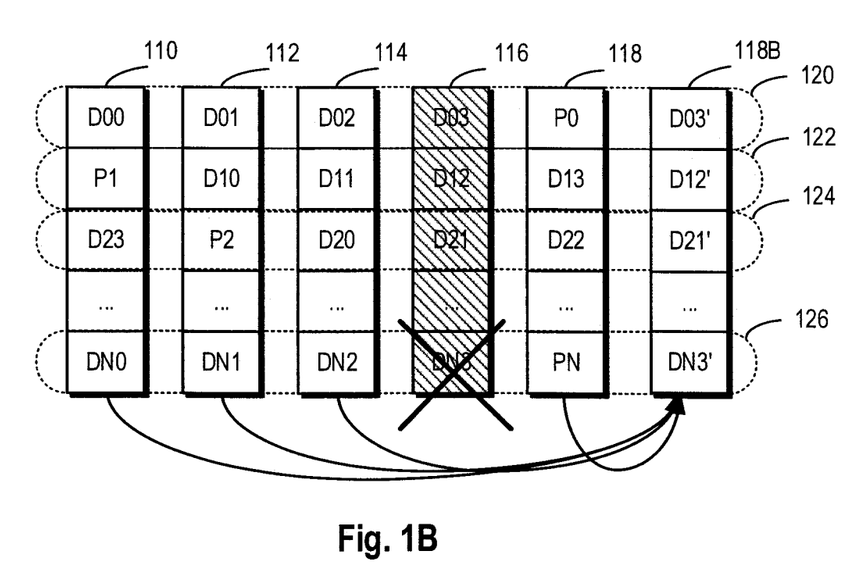

FIG. 1B illustrates a schematic diagram of a rebuild procedure of the storage system of FIG. 1A. As shown in FIG. 1B, when a storage device (such as shaded storage device 16) fails, data can be recovered from the rest multiple storage devices 110, 112, 114 and 118 in normal conditions. At this moment, a new backup storage device 118B can be added into the RAID in replacement of the storage device 118, so as to write the recovered data into 118B and fulfill system rebuild.

It should be noted that although the RAID-5 storage system including 5 storage devices (in which four storage devices are provided for data storage and 1 storage device used for parity storage) has been described above with reference to FIGS. 1A and 1B, the storage system also can include other number of storage devices based on the definition of other RAID levels. For example, two storage devices can be utilized to separately store parity P and Q based on the definition of RAID-6. For another example, three storage devices can be employed to respectively store parity P, Q and R based on the definition of triple-parity RAID.

Figure 2:
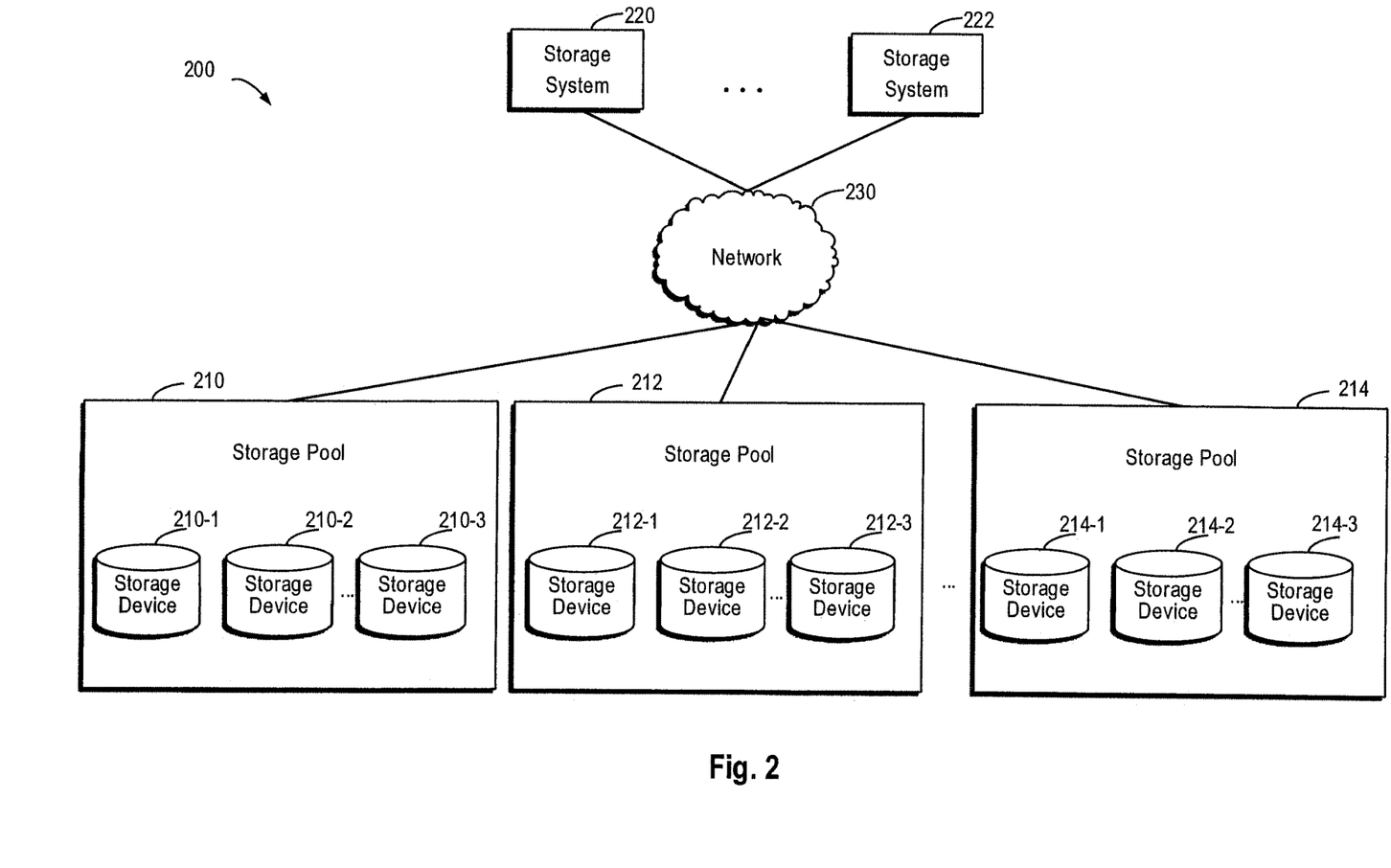
FIG. 2 schematically illustrates a block diagram of an example environment where embodiments of the present disclosure can be implemented.

As the distributed storage technology develops, respective storage devices 110, 112, 114, 116 and 118 in the storage system shown by FIGS. 1A and 1B can no longer be restricted to physical storage devices. Instead, they can be virtual storage devices and such case is the so-called mapped RAID. For example, the respective extents on the virtual storage device 110 can separately come from different physical storage devices (simply referred to as a storage device in the following text) in a storage pool. FIG. 2 schematically illustrates a block diagram of an example environment 200 where embodiments of the present disclosure can be implemented.

According to FIG. 2, the environment 200 includes a plurality of storage pools 210, 212, 214 and a plurality of storage systems 220 . . . 222 which can access storage space in the storage pools 210, 212 and 214 via a network 230. Here, the storage systems 220 . . . 222 are based on the mapped RAID. It should be appreciated that although FIG. 2 illustrates three storage pools each including three storage devices, embodiments of the present disclosure also can be applied into environments containing more or fewer storage pools and storage devices.

Each of the plurality of storage pools 210, 212 and 214 has a different device type. In this example, the storage pool 210 includes storage devices 210-1, 210-2 and 210-3 of a trinary-level cell (TLC) SSD type; the storage pool 212 includes storage devices 212-1, 212-2 and 212-3 of a single-level cell (SLC) solid-state disk (SSD) type; and the storage pool 214 consists of storage devices 214-1, 214-2 and 214-3 of a serially connected SCSI (server hard disk) (SAS) type. It should be appreciated that the device type is not restricted to the above examples. Instead, any storage devices of suitable device types, which are already known or to be developed in the, can be adopted.

Figure 3:
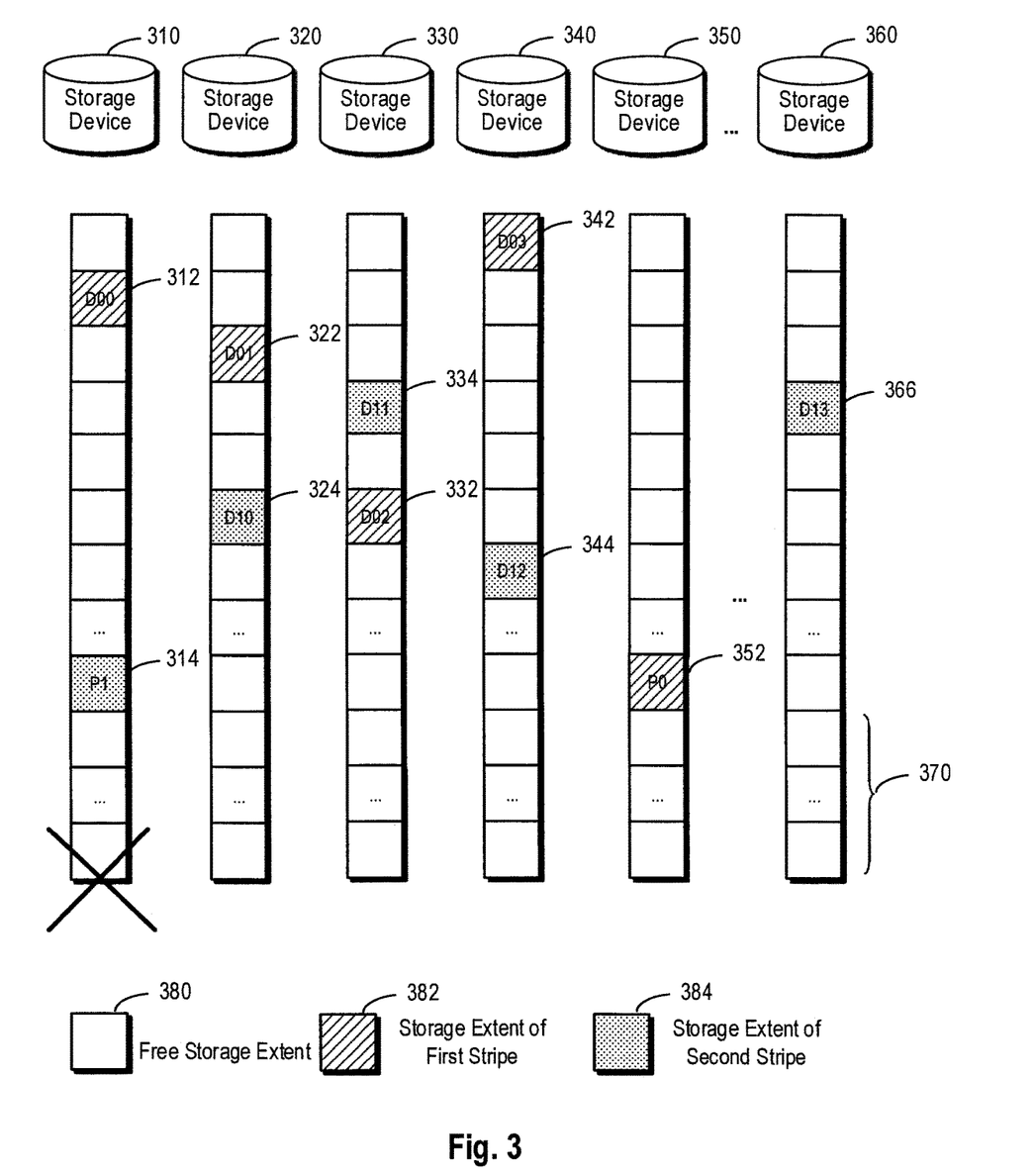
FIG. 3 schematically illustrates a graphical representation of a storage pool in FIG. 2.

FIG. 3 schematically illustrates a graphical representation of a storage pool. The storage pool can be any of the storage pools 210, 212 and 214 shown in FIG. 2. The storage pool can include a plurality of storage devices 310, 320, 330, 340, 350, . . . , 360. Each of the storage devices can consist of a plurality of storage extents, where an empty extent (indicated by reference sign 380) represents a free storage extent; striped extents (indicated by reference sign 382) denote storage extents provided for a first stripe of the storage system in FIG. 1 and shadowed extents (indicated by reference sign 384) represents storage extents provided for a second stripe of the storage system in FIG. 1. At this moment, storage extents 312, 322, 332, 342 and 352 for the first stripe respectively store data blocks D00, D01, D02 and D03 and parity P0 of the first stripe. Storage extents 324, 334, 344, 366 and 314 for the second stripe respectively store data blocks D10, D11, D12 and D13 and parity P1 of the second stripe.

As shown in FIG. 3, a reserved free part 370 also can exist in the respective storage devices, such that when a storage device in the storage pool fails, storage extents in the free part 370 of the respective storage devices can be selected to rebuild the respective extents in the fault storage device.

It should be noted that FIG. 3 illustrates how the extents in the respective stripes are distributed in a plurality of storage devices of the storage pool only by taking the 4D+1P RAID-5 storage system as an example. Those skilled in the art can implement details based on the above principles. For example, in the RAID-6 (6D+1P+1Q) storage system, 8 extents in each stripe can be distributed over a plurality of storage devices in one storage pool, which further guarantees load balancing of the plurality of storage devices.

Traditionally, each mapped RAID, which distributes the extents only in one storage pool, cannot utilize all storage devices in the plurality of storage pools to serve the user I/O operations. Besides, there are always hot data with high access frequency and cold data with low access frequency in the mapped RAID. Accordingly, for the mapped RAID distributed over storage pools with high processing power, it is a waste that the cold data is located on the storage devices with high processing power therein. Vice versa, the hot data of the mapped RAID distributed over the storage pools with low processing power has longer response time due to a lack of processing power.

In addition, when the mapped RAID is created, the storage system will determine the type of storage device utilized by the mapped RAID, i.e., determining corresponding storage pools. As time goes by, the frequency of the use of the mapped RAID may increase or decrease to dismatch with the current storage pool. It is difficult to decide on which storage pool the mapped RAID should be created because there lacks a uniform measurement for performance of different storage pools and storage devices of various device types.

Although technical solutions of load balancing among a plurality of storage devices in a storage pool have been proposed, these solutions are not suitable for load balancing among storage pools. In view of this, embodiments of the present disclosure provide an improved solution of storage management, which can allow the mapped RAID to use storage devices in all storage pools and balance the user I/O load among a plurality of storage pools. The detailed explanation is provided below with reference to FIG. 4.

Figure 4:
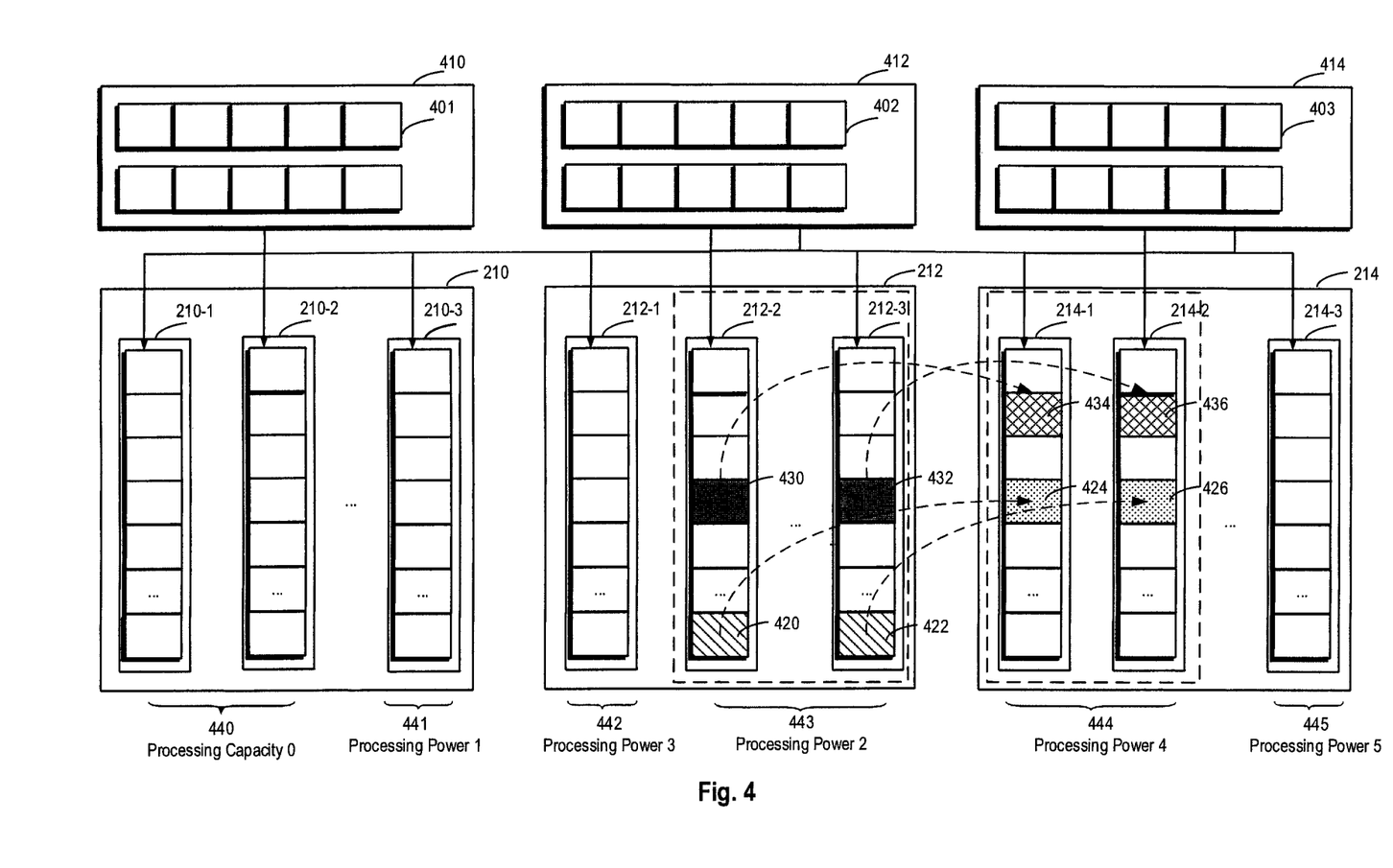
FIG. 4 illustrates a schematic diagram of a concept for storage management in accordance with embodiments of the present disclosure.

FIG. 4 illustrates a schematic diagram of a concept for storage management in accordance with embodiments of the present disclosure. The diagram includes more details in the environment shown by FIG. 2. As shown in FIG. 4, stripes 401, 402 and 403 of mapped RAIDS 410, 412 and 414 can be distributed over a plurality of storage devices of any one of the storage pools 210, 212 and 214. In accordance with embodiments of the present disclosure, the number of storage devices in all the storage pools should be no less than a width of the mapped RAID. In other words, a storage pool at least has a width of a mapped RAID. In accordance with embodiments of the present disclosure, one stripe of the mapped RAID can be distributed over any one of the storage pools, but must over the same storage pool. In some embodiments, when the mapped RAID is created, space is allocated to several stripes over the storage pool with the highest processing power to store the user data. When the allocated space runs out, space is again allocated for new stripes from the storage pool with the second highest processing power.

In accordance with embodiments of the present disclosure, the storage devices in the plurality of storage pools 210, 212 and 214 are divided into multiple sets 440 to 445 based on the processing power of the storage devices. In this example, the processing power is classified into 0 to 5 from high to low. According to FIG. 4, the set 440 includes the storage devices 210-2 and 210-2 having the highest processing power (processing power 0). The set 441 includes the storage device 210-3 having the second highest processing power (processing power 1). For example, the storage device 210 for storing system data is inferior to the storage devices 210-1 and 210-2 for storing user data in processing power for user data. The sets 442 to 445 are in the similar fashion.

In accordance with embodiments of the present disclosure, data stored on the storage devices are redistributed between the divided multiple sets 440 to 445. In some embodiments, a set having a high workload, such as set 443, and a set having a low workload, e.g., set 444, are selected from the multiple sets 440 to 445, and then partial data stored on the storage devices in the set 443, for example, data on the storage extents 430 and 432 corresponding to the stripe 402, are moved to free extents 434 and 436 in the set 444. In this way, load balancing among storage pools can be fulfilled.

In accordance with embodiments of the present disclosure, it is intended to place the hot data on the storage devices in the sets having high processing power, such that the load of each storage device is basically the same and the storage devices having high processing power are exploited to their maximum advantage, which can decrease the response time of the storage system and improve the response speed. Specific embodiments of the method of storage management in accordance with embodiments of the present disclosure are described below with reference to FIGS. 5 to 7.

Figure 5:
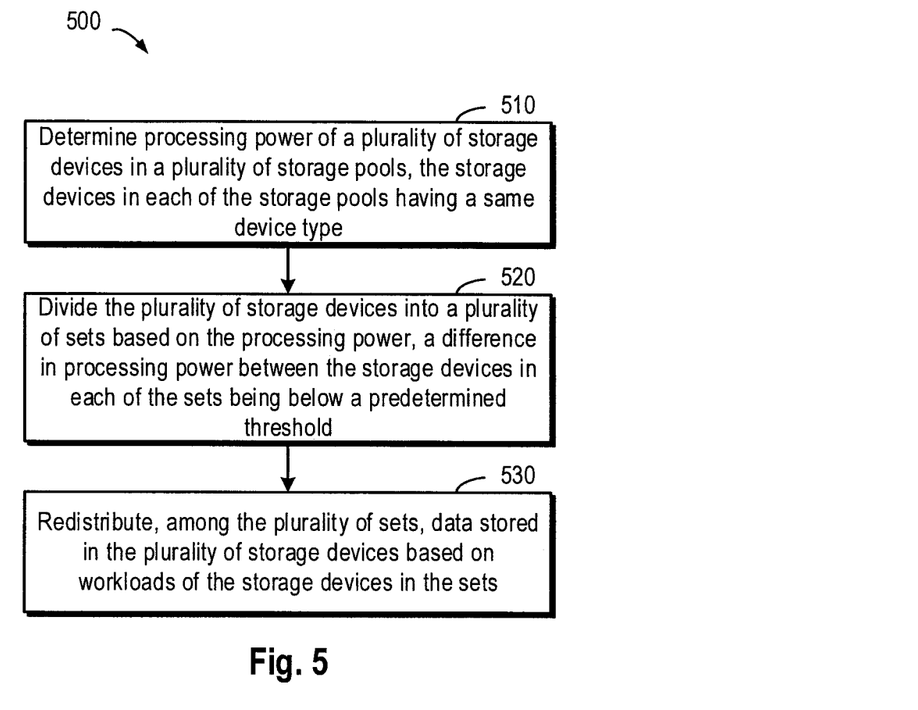
FIG. 5 schematically illustrates a flowchart of a method of storage management in accordance with embodiments of the present disclosure.

FIG. 5 schematically illustrates a flowchart of a method 500 of storage management in accordance with embodiments of the present disclosure. The method 500, which can be implemented in the storage systems 220 . . . 222 shown by FIG. 2, is accordingly described below with reference to the environment of FIG. 2.

As shown in FIG. 5, processing power of respective storage devices 210-1 to 210-3, 212-1 to 212-3 and 213-1 to 213-3 in the plurality of storage pools 210, 212 and 214 is determined at block 510. As mentioned above, the storage devices in each storage pool have the same device type. Usually, storage devices of different device types have different processing power while the storage devices of same device type have similar processing power. However, the processing power exhibited by storage devices of the same device type may vary on account of different types of data stored on the storage devices (e.g., system data and user data). For example, the processing power of the storage device for storing both system data and user data is inferior to that of the storage device for storing user data only.

In accordance with embodiments of the present disclosure, the processing power of the storage device can be determined based on type of data stored on the storage device and device type of the storage device. The processing power can be measured using various manners. In some embodiments, the processing power, for example, can be measured by means of a credit of the storage device, the credit here indicating the number of access requests which can be supported by the storage device simultaneously. The processing power of the storage device grows as the credit increases. In some embodiments, the processing power of the storage devices of the same device type, for example, can be determined based on the number of resources available for processing the user I/O requests in the storage devices. The processing power of the storage device grows as the number of available resources increases. It should be understood that the approach for measuring the processing capability is not restricted to the listed examples and instead can adopt any suitable ways, which are already known or to be developed in the art.

The plurality of storage devices 210-1 to 210-3, 212-1 to 212-3 and 213-1 to 213-3 is divided, based on the processing power determined at block 510, into multiple sets 440 to 445 at block 520. In accordance with embodiments of the present disclosure, a difference in processing power between storage devices in each of the sets 440 to 445 is below a predetermined threshold that can be set in accordance with requirements or experience. In some embodiments, the predetermined threshold can be set to zero. In some embodiments, the predetermined threshold can be set to a value close to zero.

Data stored in the storage devices is redistributed among the multiple sets 440 to 445 based on the workload of the storage devices in the sets 440 to 445 at block 530, which can accordingly realize load balancing among the storage pools 210, 212 and 214. The determination of workload for a given storage device in the set will be described below with reference to FIG. 6.

Figure 6:
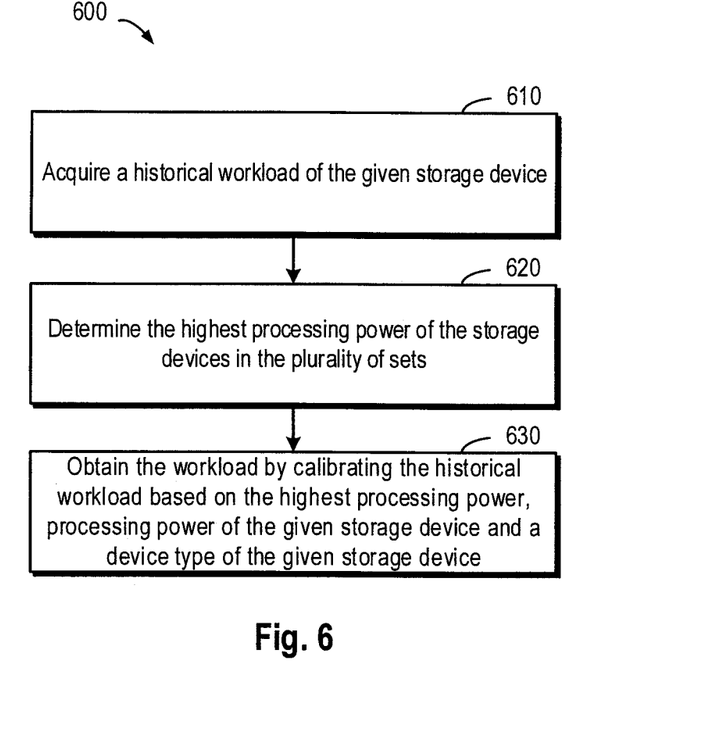
FIG. 6 schematically illustrates a flowchart of a method of determining a workload of a given storage device in accordance with embodiments of the present disclosure.

FIG. 6 schematically illustrates a flowchart of a method 600 of determining a workload of a given storage device in accordance with embodiments of the present disclosure. The method 600, which also can be implemented in the storage systems 220 . . . 222 shown by FIG. 2, is accordingly described below with reference to the environment of FIG. 2.

As shown in FIG. 6, a historical workload of a given storage device is acquired at block 610. In accordance with embodiments of the present disclosure, the historical workload of the given storage device can be determined based on at least one of: the number of data access requests for the given storage device, the number of data involved in the accesses to the given storage device and a response time of the given storage device.

In some embodiments, the historical workload can be determined based on the number of requests for the given storage device within a past period of time (e.g., 1 hour or other time intervals). As the request number grows, the workload also increases. In some embodiments, the workload can be determined based on the number of data involved in the accesses to the given storage device within a past period of time (e.g., 1 hour or other time intervals). The workload increases as the number of data involved in the accesses grows. In some embodiments, the workload can be determined based on a response time for access to the give storage device within a past period of time (e.g., 1 hour or other time intervals). For example, an average value of response time for multiple accesses can be obtained and the workload increases as the average value grows. It should be appreciated that embodiments of the present disclosure are not restricted to this and any other suitable ways can be adopted.

The highest processing power of the storage devices in the multiple sets 440 to 445 is determined at block 620. In some embodiments of the present disclosure, the highest processing power can be determined by sorting the processing power of respective storage devices determined at block 510. In this example, the storage devices 210-1 and 210-2 have the highest processing power (processing power 0).

The workload of the given storage device can be obtained at block 630 by calibrating the historical workload based on the highest processing power, the processing power of the given storage device and the device type of the given storage device. It will be understood that the same user I/O request will result into different workloads at various storage devices since the processing power of the storage devices in different sets vary from one another. Therefore, the impacts on the storage devices by the user I/O requests can be measured more accurately by calibrating the collected historical workload with differences between storage devices in processing power and device type. In some embodiments, the workload of the storage device can be determined based on the following formula 1:

$$T_x = T_x' \times e^{-\alpha \times \Delta t} + \frac{\Delta H_x \times \beta_x (1 - e^{-\alpha \times \Delta t})}{\alpha \times \Delta t} \times \gamma \tag{1}$$

Where $$\beta_x = \frac{Credit_0}{Credit_x},$$

in which $Credit_x$ represents the processing power of the storage devices in the set x and $Credit_0$ denotes the highest processing power of the storage devices in the multiple sets. In the formula, $T_x$ indicates the workload of the storage devices in the set x; $T_x'$ represents the workload (i.e., historical workload) of the storage devices in the set x before time $\Delta t$; $\Delta t$ is a difference between a previous sampling time and a current time and $\alpha$ is a decay factor derived from temperature exponential half-life decay period; $\Delta H_x$ represents I/O activity of storage devices in the set x during the time period $\Delta t$; and $\gamma$ is performance disposition factor which changes along with the device type. Usually, the processing power of the storage device is higher as $\gamma$ decreases. It should be understood that the formula 1 is also suitable for determining processing power of a certain storage extent in the given storage device. In addition, it should be appreciated that the processing of the block 620 can be implemented via any other suitable ways and is not restricted to be performed in the particular manner of the listed formula 1.

Accordingly, it can be guaranteed that all I/O loads are evenly distributed over the respective storage devices by increasing the workloads of the storage devices in the set with low processing power at a faster speed. Besides, a small γ is provided for the set with high processing power to increase the workloads in the set with high processing power at a lower speed, so as to enhance the use ratio of the set and make the set carry more I/O loads. Accordingly, the response speed of the storage system can be greatly improved.

When the workloads of the storage devices in the sets 440 to 445 are determined, a first set of storage devices having a high workload and a second set of storage devices having a low workload, e.g., set 443 and set 444, can be selected from the above sets based on the workloads. Besides, a part of the data stored in the first set of storage devices is moved to the second set of storage devices. This can be implemented via various ways. Detailed description is provided below with reference to FIG. 7, which schematically illustrates a flowchart of a method 700 of redistributing data among multiple sets in accordance with embodiments of the present disclosure. The method 700, which also can be implemented in the storage systems 220 . . . 222 shown in FIG. 2, is accordingly described below with reference to the environment of FIG. 2.

Figure 7:
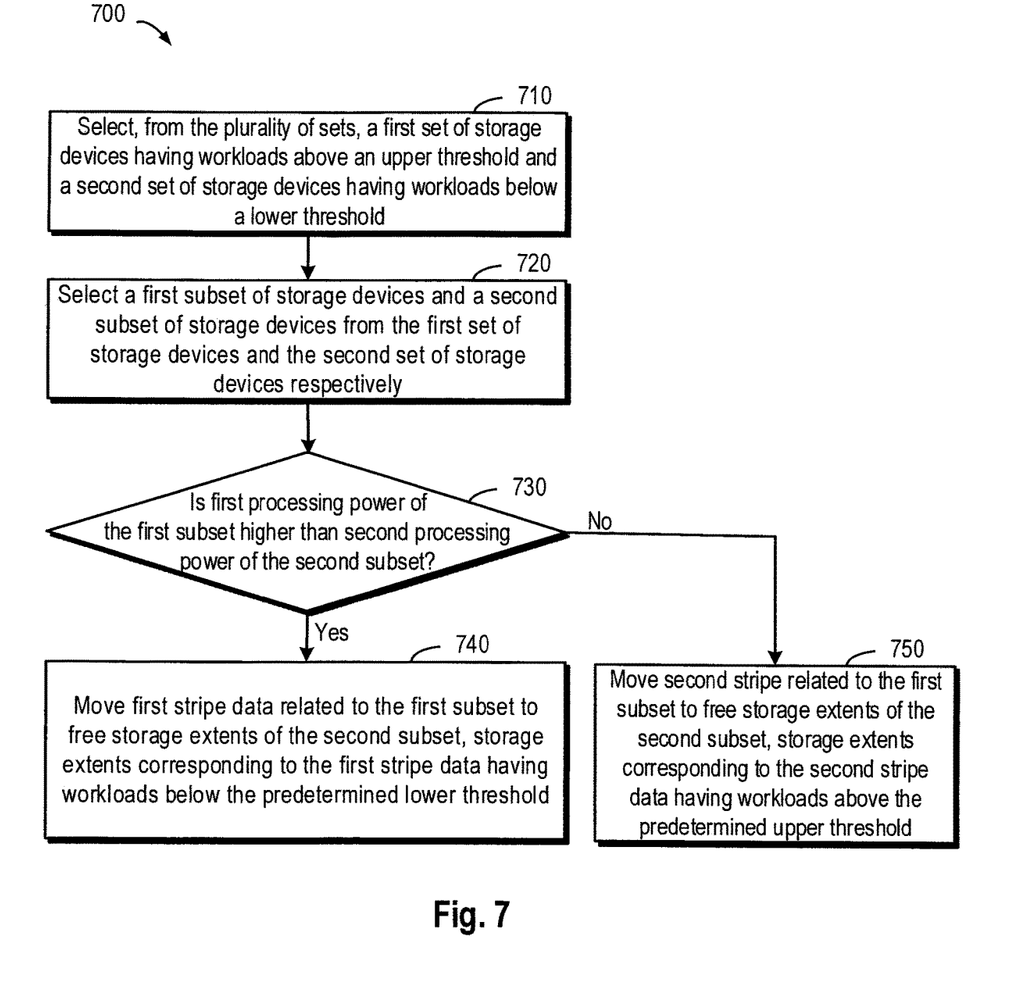
FIG. 7 schematically illustrates a flowchart of a method of redistributing data among a plurality of sets in accordance with embodiments of the present disclosure.

As shown in FIG. 7, a first set of storage devices and a second set of storage devices can be selected from the multiple sets 440 to 445 at block 710, the first set of storage devices having a workload above an upper threshold and the second set of storage devices having a workload below a lower threshold. It should be appreciated that the upper threshold and the lower threshold can be configured based on the requirements or experience and may be identical or different. In some embodiments, the workload of the set can be determined by determining a sum of workloads of the storage devices in each set.

In some embodiments, storage devices having the highest workload, such as storage device 212-2, and storage devices having the lowest workload, such as storage device 214-1, can be selected from the respective storage devices in the sets 440 to 450, and the set to which the storage devices having the highest workload belong, e.g., the set 443, can act as the first set of storage devices while the set to which the storage devices having the lowest workload belong, e.g., the set 444, can act as the second set of storage devices.

In an alternative embodiment, the storage devices having the second highest workload and the storage devices having the second lowest workload also can be selected and the first set of storage devices and the second set of storage devices can be determined on this basis. It should be understood that the embodiments of the present disclosure are not restricted to this. Instead, the first set of storage devices and the second set of storage devices can be determined in any other suitable ways.

At block 720, a first subset of storage devices and a second subset of storage devices are selected respectively from the first set of storage devices 443 and the second set of the storage devices 444. In this example, the first subset includes the storage devices 212-2 and 212-3 and the second subset contains the storage devices 214-1 and 214-2. In some embodiments, an average value (also known as a first average value) of workloads of the storage devices in the first set of storage devices 443 can be determined and the storage device having a workload that is higher than the first average value by an amount exceeding a first threshold can be selected from the first set of storage devices 443 to form the first subset. In some embodiments, an average value (also known as a second average value) of workloads of the storage devices in the second set of storage devices 444 can be determined and the storage device having a workload that is lower than the second average value by an amount exceeding a second threshold can be selected from the second set of storage devices 444 to form the second subset. It should be appreciated that the first threshold and the second threshold can be configured in accordance with requirements or experience and may be identical or different.

In some embodiments, the first subset and the second subset can be selected based on the following formula 2:

$$\begin{cases} T_{hot} > T_{avg} \times (1+\delta) \\ T_{cold} < T_{avg} \times (1-\delta) \end{cases} \quad (2)$$

Where $T_{hot}$ represents workloads of storage devices which are frequently accessed; $T_{cold}$ indicates workloads of storage devices which are rarely accessed; $T_{avg}$ denotes an average value of the workloads of all storage devices in the set of interest; and δ is a scale factor which can be preset according to experience. For example, δ is set to 10%. It should be understood that 10% is only an example and the embodiments of the present disclosure are not restricted to this. Besides, it should be appreciated that the formula 2 also can be applied to determine a workload of a given storage extent in a storage device. It also should be understood that formula 2 is by way of example only and embodiments of the present disclosure also can perform the selection of the first subset and the second subset via any other suitable ways.

In accordance with embodiments of the present disclosure, source data can be selected from stripe data related to the first subset based on the processing power of the first subset and the second subset, so as to move the source data from the first subset to the second subset. In this way, the hot data can be placed on the storage devices having high processing power, to exploit the storage devices having high processing power to their maximum advantage and enhance the response speed of the storage system. The detailed description is provided below with reference to blocks 730 to 750.

It is determined, at block 730, whether first processing power of the first subset is higher than second processing power of the second subset. As described in the block 520, the difference of processing power among storage devices in each set is lower than the predetermined threshold. In some embodiments, the average processing power of the storage devices in the first subset can be determined as the processing power of the first subset (i.e., the first processing power). Similarly, the average processing power of the storage devices in the second subset can be determined as the processing power of the second subset (i.e., the second processing power). In some embodiments, the processing power of a certain storage device in the first subset also can act as the first processing power and the processing power of a certain storage device in the second subset also can act as the second processing power. It should be understood that embodiments of the present disclosure also can determine the processing power of the first subset and the second subset in other ways and the determination is not restricted to the above examples.

In response to determining at block 730 that the first processing power is higher than the second processing power, the method proceeds to block 740. At block 740, first stripe data (e.g., data on the storage extents 430 and 432) related to the first subset is moved to a free storage extent (such as the storage extents 434 and 436) of the second subset, the storage extents corresponding to the first stripe data having a workload below the predetermined lower threshold. It will be understood that it is intended to place the hot data on the storage devices having high processing power, so as to exploit the storage devices having high processing power to their maximum advantage. Meanwhile, the load balancing procedure is accelerated due to the movement of the cold data, which facilitates enhancement of the response speed.

In accordance with some embodiments of the present disclosure, a sum of workloads of storage extents corresponding to a given stripe data related to the first subset can be determined, and the summation is compared with the predetermined lower threshold to determine the first stripe data. In some embodiments, the predetermined lower threshold can be determined in accordance with requirements or experience.

In some embodiments, the first stripe data can be determined based on the formula 2. For example, a third average value of the workloads of the storage extents corresponding to the stripe data related to the first subset is determined and stripe data, which has corresponding storage extents that have a workload lower than the third average value by an amount exceeding a third threshold, is selected as the first stripe data. It should be appreciated that the third threshold can be identical to or different from the first threshold.

In response to determining that the first processing power is lower than the second processing power at block 730, the method 700 proceeds to block 750. At block 750, second stripe data (e.g., data on storage extents 420 and 422) related to the first subset is moved to free storage extents (such as storage extents 424 and 426) of the second subset, the storage extents corresponding to the second stripe data having a workload above the predetermined upper threshold. It will be understood that it is also intended to place the hot data on the storage devices having high processing power, to exploit the storage devices having high processing power to their maximum advantage.

In accordance with some embodiments of the present disclosure, second stripe data can be determined by comparing the third average value with the predetermined upper threshold. In some embodiments, the predetermined upper threshold can be determined according to requirements or experience. In some embodiments, the predetermined upper threshold can be identical to the above predetermined lower threshold. In some embodiments, the predetermined upper threshold can be different from the above predetermined lower threshold.

In alternative embodiments, the second stripe data also can be determined based on the formula 2. For example, stripe data, which has corresponding storage extents that have a workload higher than the third average value by an amount exceeding a fourth threshold, is selected from the stripe data related to the first subset as the second stripe data. It should be appreciated that the fourth threshold can be identical to or different from the third threshold.

In accordance with embodiments of the present disclosure, for example, upon the storage devices on the storage extents 430 and 432 in the set 443 are moved to the set 444, a mapping table between the mapped RAID 412 and the storage pools 212 and 214 is updated. In accordance with embodiments of the present disclosure, if the second subset lacks storage extents available for the source data, a third storage device is determined from the remaining storage devices in the second set of storage devices 444 and the source data is stored into the third storage device. In some embodiments, the third storage device can be a storage device having the lowest workload in the remaining storage devices. In alternative embodiments, the third storage device also can be a storage device having the second lowest workload in the remaining storage devices. Of course, the embodiments of the present disclosure are not restricted to these examples and can be implemented in any other suitable ways.

In accordance with embodiments of the present disclosure, the load balancing also can be performed within the divided multiple sets 440 to 445 in addition to among the sets 440 to 445. In some embodiments, a part of the data on the storage devices having a high load can be moved to the storage devices having a low load, which accordingly can balance the workloads of the storage devices in the plurality of storage pools more quickly and exploit the storage devices in the plurality of storage pools more fully.

One load balancing operation of storage devices in the plurality of storage pools 210, 212 and 214 has been completed so far. In accordance with embodiments of the present disclosure, the operation can be repeated until the workloads of the storage devices are balanced.

The method of storage management in accordance with embodiments of the present disclosure is described above with reference to FIGS. 5 to 7. In accordance with this method, since all extents corresponding to the stripes of the mapped RAID can be distributed over any and same storage pool, each mapped RAID associated with the plurality of storage pools can use all storage devices to improve utilization of the storage resources in the plurality of storage pools. Moreover, the hot data is placed on the storage devices having high processing power, so as to exploit the storage devices having high processing power to their maximum advantage and enhance the response speed of the storage system. Besides, the moving operations of the cold data can be performed based on the difference of the processing power, which accelerates the load balancing procedure and further increases the response speed of the storage system.

Figure 8:
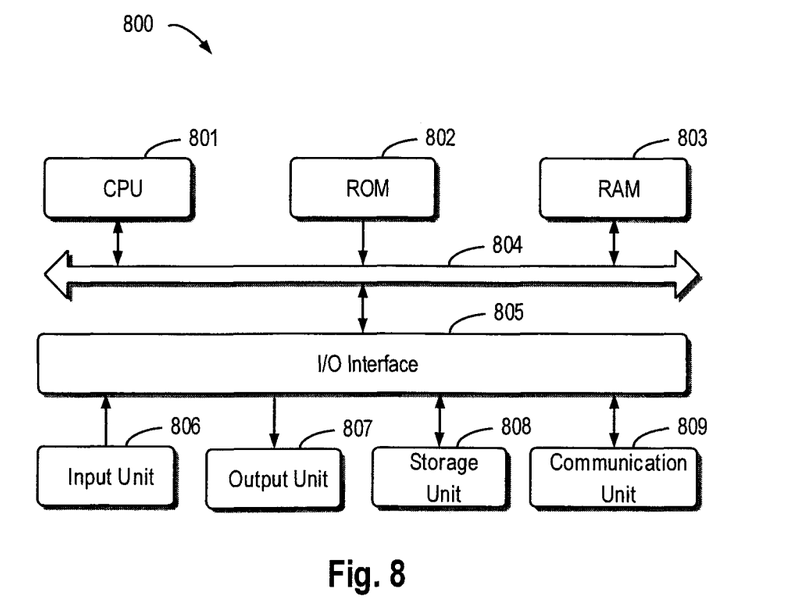
FIG. 8 schematically illustrates a block diagram of an electronic device for storage management in accordance with example implementations of the present disclosure.

FIG. 8 schematically illustrates a block diagram of a device 800 for storage management in accordance with example implementations of the present disclosure. As shown, the device 800 includes a central process unit (CPU) 801, which can execute various suitable actions and processing based on the computer program instructions stored in a read-only memory (ROM) 802 or computer program instructions loaded in a random-access memory (RAM) 803 from a storage unit 808. The RAM 803 can also store all kinds of programs and data required by the operations of the device 800. The CPU 801, ROM 802 and RAM 803 are connected to each other via a bus 804. An input/output (I/O) interface 805 is also connected to the bus 804.

A plurality of components in the device 800 is connected to the I/O interface 805, including: an input unit 806, such as keyboard, mouse and the like; an output unit 807, e.g., various kinds of display and loudspeakers etc.; a storage unit 808, such as disk and optical disk etc.; and a communication unit 809, such as network card, modem, wireless transceiver and the like. The communication unit 809 allows the device 800 to exchange information/data with other devices via the computer network, such as Internet, and/or various telecommunication networks.

The above described respective procedures and processing, such as the methods 500 to 700, can be executed by the processing unit 801. For example, in some implementations, the methods 500 to 700 can be implemented as computer software program tangibly included in the machine-readable medium, e.g., the storage unit 808.

In some implementations, the computer program can be partially or fully loaded and/or mounted to the device 800 via ROM 802 and/or communication unit 809. When the computer program is loaded to the RAM 803 and executed by the CPU 801, one or more steps of the above described methods 500 to 700 can be implemented. Alternatively, in other implementations, the CPU 801 also can be configured via any other suitable ways to execute the above procedures/methods.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a peer machine or entirely on the peer machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. A method of storage management, comprising:
    determining processing power of a plurality of storage devices in a plurality of storage pools, the storage devices in each of the storage pools having a same device type;
    dividing the plurality of storage devices into a plurality of sets based on the processing power, a difference in the processing power between the storage devices in each of the sets being below a predetermined threshold;
    redistributing, among the plurality of sets, data stored in the plurality of storage devices based on workloads of the storage devices in the sets; and
    determining the workload for a given storage device by:
        acquiring a historical workload of the given storage device;
        determining the highest processing power of the storage devices in the plurality of sets; and
        obtaining the workload by calibrating the historical workload based on the highest processing power, the processing power of the given storage device, and a device type of the given storage device.

2. The method of claim 1, wherein determining the processing power comprises:
    acquiring the device type of the storage devices;
    acquiring a data type of data in the storage devices; and
    determining the processing power of the storage devices based on the data type and the device type.

3. The method of claim 1, wherein acquiring the historical workload of the given storage device comprises determining the historical workload of the given storage device based on at least one of:
    the number of data access requests for the given storage device;
    the number of data related to access to the given storage device; and
    a response time of the given storage device.

4. The method of claim 1, wherein redistributing the data comprises:
    selecting, from the plurality of sets, a first set of storage devices having a workload above an upper threshold;
    selecting, from the plurality of sets, a second set of storage devices having a workload below a lower threshold; and
    moving partial data stored in the first set of storage devices to the second set of storage devices.

5. The method of claim 1, further comprising:
    for storage devices in at least one set of the plurality of sets:
    determining an average value of workloads of the storage devices; and
    in response to a first storage device in the at least one set having a workload that is higher than the average value by an amount exceeding a fifth threshold, moving partial data in the first storage device to a second storage device in the at least one set having a workload that is lower than the average value by an amount exceeding a sixth threshold.

6. A method of storage management, comprising:
    determining processing power of a plurality of storage devices in a plurality of storage pools, the storage devices in each of the storage pools having a same device type;
    dividing the plurality of storage devices into a plurality of sets based on the processing power, a difference in the processing power between the storage devices in each of the sets being below a predetermined threshold; and
    redistributing, among the plurality of sets, data stored in the plurality of storage devices based on workloads of the storage devices in the sets;
    wherein redistributing the data comprises:
    selecting, from the plurality of sets, a first set of storage devices having a workload above an upper threshold;

selecting, from the plurality of sets, a second set of storage devices having a workload below a lower threshold; and moving partial data stored in the first set of storage devices to the second set of storage devices; and wherein moving the data comprises:

determining a first average value of workloads of the first set of storage devices;

selecting, from the first set of storage devices, a first subset of storage devices having a workload that is higher than the first average value by an amount exceeding a first threshold;

determining a second average value of workloads of the second set of storage devices;

selecting, from the second set of storage devices, a second subset of storage devices having a workload that is lower than the second average value by an amount exceeding a second threshold; and moving partial data stored in the first subset to the second subset.

7. The method of claim 6, wherein moving the data comprises:

determining first processing power and second processing power corresponding to storage devices in the first subset and in the second subset, respectively;

selecting source data from stripe data related to the first subset based on the first processing power and the second processing power; and moving the source data to the second subset.

8. The method of claim 7, wherein selecting the source data comprises:

determining a third average value of workloads of storage extents corresponding to the stripe data related to the first subset;

in response to the first processing power being higher than the second processing power, selecting first stripe data from the stripe data as the source data, the storage extents corresponding to the first stripe data having a workload that is lower than the third average value by an amount exceeding a third threshold; and in response to the first processing power being lower than the second processing power, selecting second stripe data from the stripe data as the source data, the storage extents corresponding to the second stripe data having a workload that is higher than the third average value by an amount exceeding a fourth threshold.

9. The method of claim 7, further comprising:

in response to a lack of storage extents available for the source data in the second subset, determining, from remaining storage devices in the second set of storage devices, a third storage device having the lowest workload among the remaining storage devices; and moving the source data to the third storage device.

10. An electronic device, comprising:

at least one processor;

a memory coupled to the at least one processor and having instructions stored thereon, the instructions, when executed by the at least one processor, causing the device to perform acts comprising:

determining processing power of a plurality of storage devices in a plurality of storage pools, the storage devices in each of the storage pools having a same device type;

dividing the plurality of storage devices into a plurality of sets based on the processing power, a difference in the processing power between the storage devices in each of the sets being below a predetermined threshold;

redistributing, among the plurality of sets, data stored in the plurality of storage devices based on workloads of the storage devices in the sets; and determining the workload for a given storage device by:

acquiring a historical workload of the given storage device;

determining the highest processing power of the storage devices in the plurality of sets; and obtaining the workload by calibrating the historical workload based on the highest processing power, the processing power of the given storage device, and a device type of the given storage device.

11. The device of claim 10, wherein determining the processing power comprises:

acquiring the device type of the storage devices;

acquiring a data type of data in the storage devices; and determining the processing power of the storage devices based on the data type and the device type.

12. The device of claim 10, wherein acquiring the historical workload of the given storage device comprises determining the historical workload of the given storage device based on at least one of:

the number of data access requests for the given storage device;

the number of data related to access to the given storage device; and a response time of the given storage device.

13. The device of claim 10, wherein redistributing the data comprises:

selecting, from the plurality of sets, a first set of storage devices having a workload above an upper threshold;

selecting, from the plurality of sets, a second set of storage devices having a workload below a lower threshold; and moving partial data stored in the first set of storage devices to the second set of storage devices.

14. The device of claim 10, wherein the acts further comprise:

for storage devices in at least one set of the plurality of sets:

determining an average value of workloads of the storage devices; and in response to a first storage device in the at least one set having a workload that is higher than the average value by an amount exceeding a fifth threshold, moving partial data in the first storage device to a second storage device in the at least one set having a workload that is lower than the average value by an amount exceeding a sixth threshold.

15. An electronic device, comprising:

at least one processor;

a memory coupled to the at least one processor and having instructions stored thereon, the instructions, when executed by the at least one processor, causing the device to perform acts comprising:

determining processing power of a plurality of storage devices in a plurality of storage pools, the storage devices in each of the storage pools having a same device type;

dividing the plurality of storage devices into a plurality of sets based on the processing power, a difference in the processing power between the storage devices in each of the sets being below a predetermined threshold; and redistributing, among the plurality of sets, data stored in the plurality of storage devices based on workloads of the storage devices in the sets;

wherein redistributing the data comprises:
selecting, from the plurality of sets, a first set of storage devices having a workload above an upper threshold;
selecting, from the plurality of sets, a second set of storage devices having a workload below a lower threshold; and
moving partial data stored in the first set of storage devices to the second set of storage devices; and wherein moving the data comprises:
determining a first average value of workloads of the first set of storage devices;
selecting, from the first set of storage devices, a first subset of storage devices having a workload that is higher than the first average value by an amount exceeding a first threshold;
determining a second average value of workloads of the second set of storage devices;
selecting, from the second set of storage devices, a second subset of storage devices having a workload that is lower than the second average value by an amount exceeding a second threshold; and
moving partial data stored in the first subset to the second subset.

16. The device of claim 15, wherein moving the data comprises:
determining first processing power and second processing power corresponding to storage devices in the first subset and in the second subset respectively;
selecting source data from stripe data related to the first subset based on the first processing power and the second processing power; and
moving the source data to the second subset.

17. The device of claim 16, wherein selecting the source data comprises:
determining a third average value of workloads of storage extents corresponding to the stripe data related to the first subset;
in response to the first processing power being higher than the second processing power, selecting first stripe data from the stripe data as the source data, the storage extents corresponding to the first stripe data having a workload that is lower than the third average value by an amount exceeding a third threshold; and
in response to the first processing power being lower than the second processing power, selecting second stripe data from the stripe data as the source data, the storage extents corresponding to the second stripe data having a workload that is higher than the third average value by an amount exceeding a fourth threshold.

18. The device of claim 16, wherein the acts further comprise:
in response to a lack of storage extents available for the source data in the second subset, determining, from remaining storage devices in the second set of storage devices, a third storage device having the lowest workload among the remaining storage devices; and
moving the source data to the third storage device.

19. A computer program product having a non-transitory computer readable medium which stores a set of instructions to perform storage management; the set of instructions, when carried out by computerized circuitry, causing the computerized circuitry to perform a method of:
determining processing power of a plurality of storage devices in a plurality of storage pools, the storage devices in each of the storage pools having a same device type;
dividing the plurality of storage devices into a plurality of sets based on the processing power, a difference in the processing power between the storage devices in each of the sets being below a predetermined threshold; and
redistributing, among the plurality of sets, data stored in the plurality of storage devices based on workloads of the storage devices in the sets; and
determining the workload for a given storage device by:
acquiring a historical workload of the given storage device;
determining the highest processing power of the storage devices in the plurality of sets; and
obtaining the workload by calibrating the historical workload based on the highest processing power, the processing power of the given storage device, and a device type of the given storage device.

20. A method of storage management, comprising:
determining processing power of a plurality of storage devices in a plurality of storage pools, the storage devices in each of the storage pools having a same device type;
dividing the plurality of storage devices into a plurality of sets based on the processing power, a difference in the processing power between the storage devices in each of the sets being below a predetermined threshold;
redistributing, among the plurality of sets, data stored in the plurality of storage devices based on workloads of the storage devices in the sets; and
for storage devices in at least one set of the plurality of sets:
determining an average value of workloads of the storage devices; and
in response to a first storage device in the at least one set having a workload that is higher than the average value by an amount exceeding a fifth threshold, moving partial data in the first storage device to a second storage device in the at least one set having a workload that is lower than the average value by an amount exceeding a sixth threshold.

21. The method of claim 20, wherein determining the processing power comprises:
acquiring the device type of the storage devices;
acquiring a data type of data in the storage devices; and
determining the processing power of the storage devices based on the data type and the device type.

22. The method of claim 20, wherein redistributing the data comprises:
selecting, from the plurality of sets, a first set of storage devices having a workload above an upper threshold;
selecting, from the plurality of sets, a second set of storage devices having a workload below a lower threshold; and
moving partial data stored in the first set of storage devices to the second set of storage devices.

* * * * *